July 7, 1959 T. M. JONES 2,893,536
CONVEYOR MECHANISMS FOR USE IN STERILISING OR PRESERVING CONVEYOR
Filed Sept. 27, 1954 5 Sheets-Sheet 1

Inventor
T. M. Jones
By Attys.

July 7, 1959 T. M. JONES 2,893,536
CONVEYOR MECHANISMS FOR USE IN STERILISING OR PRESERVING CONVEYOR
Filed Sept. 27, 1954 5 Sheets-Sheet 5

Inventor
T. M. Jones

United States Patent Office 2,893,536
Patented July 7, 1959

2,893,536

CONVEYOR MECHANISMS FOR USE IN STERILISING OR PRESERVING CONVEYOR

Thomas Marsden Jones, Hove, England, assignor to Mitchell Engineering Limited, London, and R. W. Webster & Company Limited, Waltham Cross, England Application September 27, 1954, Serial No. 458,634

2 Claims. (Cl. 198—31)

This invention relates to sterilising, preserving or like apparatus, and is particularly applicable to sterilising or preserving apparatus of the continuous processing type in which the articles containing the materials to be processed are carried through the apparatus by some form of conveyor mechanism so that they are subjected to the required heat treatment for a predetermined time.

In apparatus of this character heretofore known, however, difficulties have arisen in providing a form of conveyor mechanism which is fully automatic in operation and which is at the same time capable of supplying the apparatus with articles to its maximum capacity.

The present invention has for its main object to overcome these difficulties and the invention accordingly consists in a conveyor mechanism for use in sterilising or preserving apparatus of the kind referred to comprising a plurality of links or sections which form part of a flexible conveyor and are adapted to accommodate the articles between them during their passage through the apparatus, said links or sections being so constructed and arranged as to provide spaces or openings between the outer parts of adjacent links or sections for effecting the admission or discharge of the articles.

The invention also consists in a conveyor mechanism for use in sterilising or preserving apparatus of the kind referred to, comprising a plurality of links or sections which form part of a flexible conveyor and are so constructed and arranged as to provide a series of housings or carriers for the articles, said housings or carriers having openings at their outer sides to permit the admission or discharge of successive rows of articles.

The invention also consists in a conveyor mechanism for use in sterilising or preserving apparatus of the kind referred to comprising a plurality of links or sections which are adapted to accommodate the articles between them during their passage through the apparatus, said links or sections being so constructed as to form housings or carriers for the articles and being so arranged as to form part of a flexible conveyor which is adapted to move in a curved path through part of its travel so as to open adjacent links or sections sufficiently to allow the admission or discharge of the articles.

According to the preferred arrangement, the aforesaid conveyor mechanism comprises a plurality of bars of approximately I-section mounted parallel to one another between endless chains or belts adapted to convey the bars through the sterilising or preserving apparatus, means being provided for moving said chains or belts over a curved path opposite a feeding or collecting device so as to swing the adjacent bars apart for a predetermined time interval and thereby permit sets of articles to be successively fed into or discharged from the spaces between adjacent bars.

Preferably, the flanged ends of the I-sectioned bars are of different widths, the bars being so arranged that the flanges of narrower width are on the outside of the conveyor at the feeding and discharging positions and the bars may be in double form and similarly mounted so as to provide two sets of article accommodating spaces disposed on opposite sides of the conveyor, the chains or belts being arranged to move successively round oppositely arranged curves so as to cause each set of bars to open successively, thereby enabling the capacity of the conveyor mechanism to be doubled.

Additional conveyor means are preferably provided for delivering the articles into a position opposite to the aforesaid curved path or paths, and means may be provided for synchronising the respective speeds of the conveyors, whereby a complete row of articles may be automatically loaded into each housing space provided by the successive pairs of bars, means also being provided for automatically stopping the supply of articles between each successive loading movement.

The invention will be more completely understood from the following detailed description which is given in conjunction with the accompanying drawings in which.

Figures 1, 2:
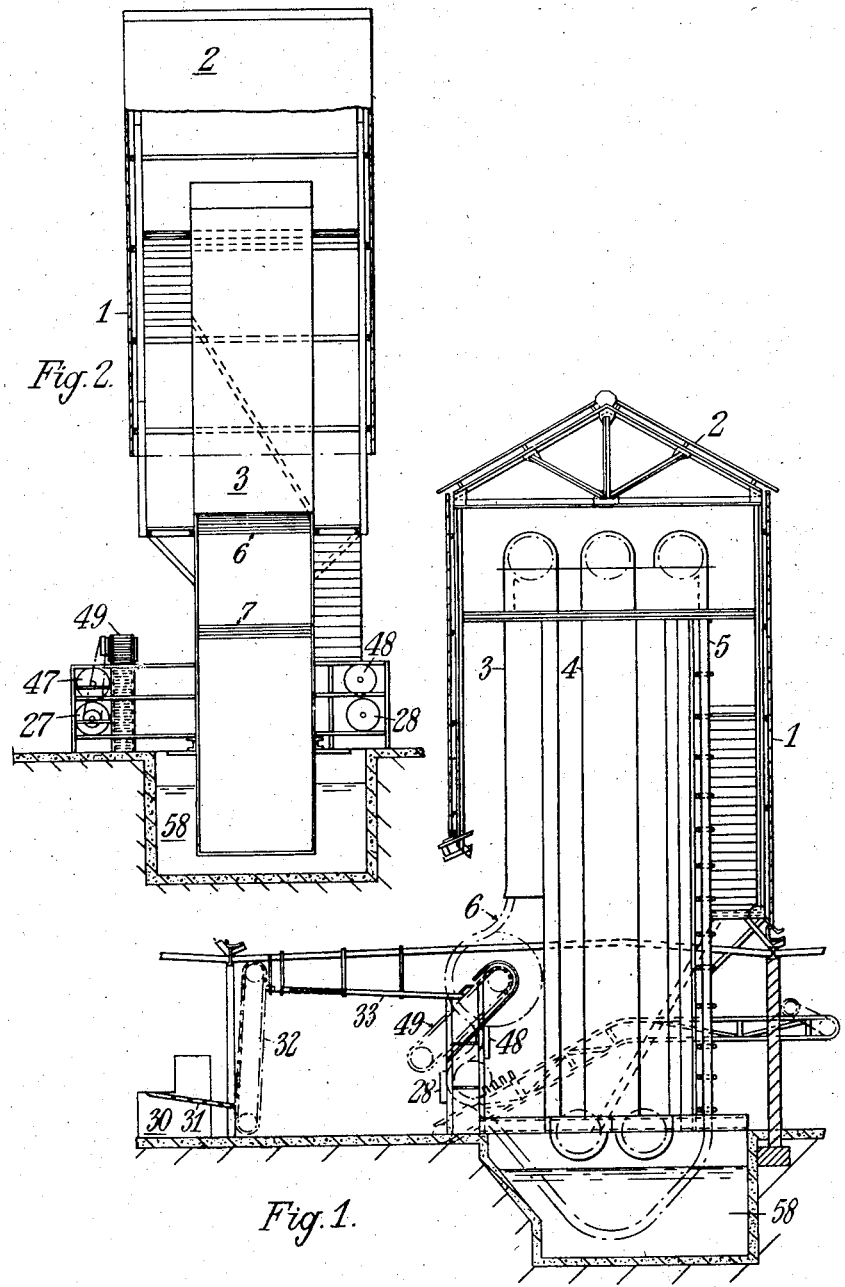
Figures 1 and 2 are side and front views respectively of a sterilising or preserving apparatus in which the invention is embodied.
Figure 3:
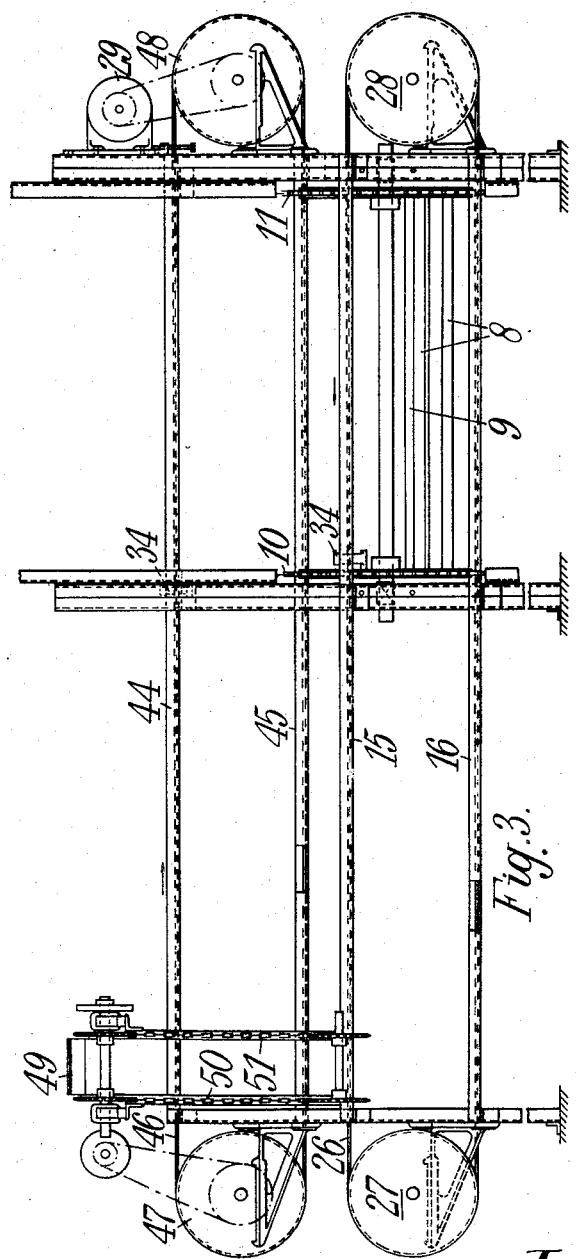
Figure 3 is an enlarged front view of the feeding apparatus employed for feeding articles such as sealed cylindrical cans into the apparatus.

Referring now to these drawings, the sterilising or preserving apparatus is constructed in the form of an upright housing 1, having a roof 2, and windows or ventilators as required, and within this housing there are provided three upright chambers 3, 4 and 5 through which a conveyor mechanism 6 is arranged to pass. This conveyor mechanism 6 is constructed in the form of a plurality of bars 7 of I-section, that is, having a central web and flanges at right angles to the web, which are conveniently formed from extruded aluminium and so shaped that the flanged ends 8 and 9 of each section are of different widths, one flange 8 being narrower than the other 9. These bars 7 are arranged parallel to one another, their opposite ends being mounted at the mid points of each link of two endless chains 10, 11 which are disposed parallel to one another in such a way that the adjacent wider flanges 9 of the bars 7 are separated by a small space, each pair of links in the two chains thus carrying one bar. By means of this arrangement a narrow chamber or housing is formed between each successive pair of bars which are so arranged as to accommodate a row of articles such as cylindrical containers 12 lying on their sides.

Figure 4:
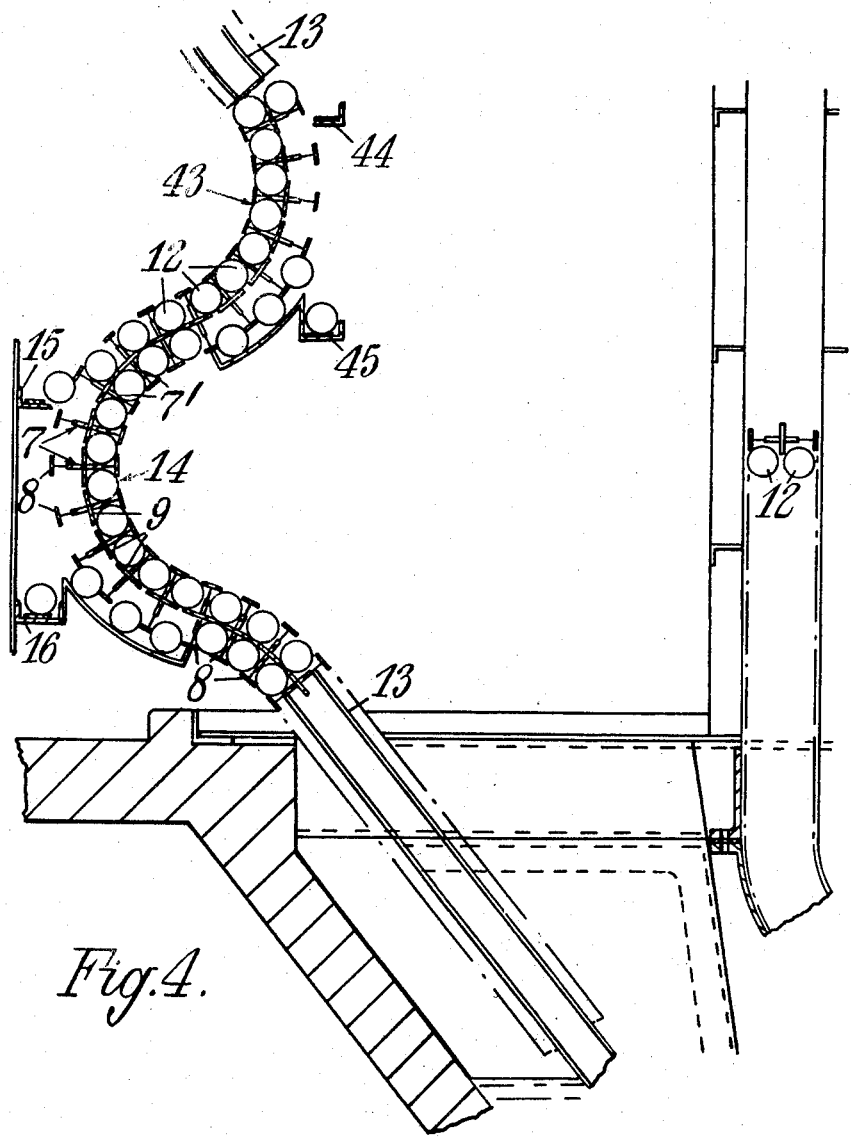
Figure 4 is a fragmentary view of the conveyor means employed for accommodating double rows of articles such as sealed cylindrical cans and conveying them through the apparatus.
Figure 5:
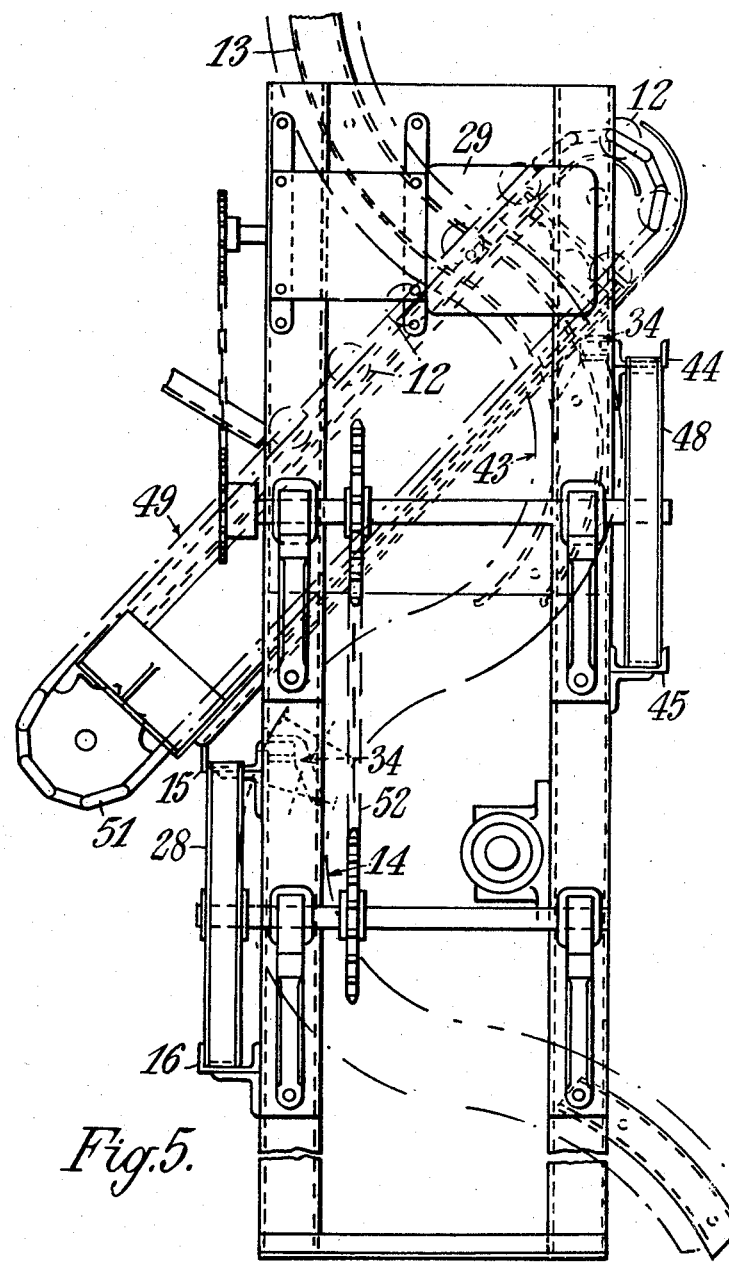
Figure 5 is a front view of a form of mechanism employed for delivering the articles on the feeding apparatus shown in Figure 3.
Figure 6:
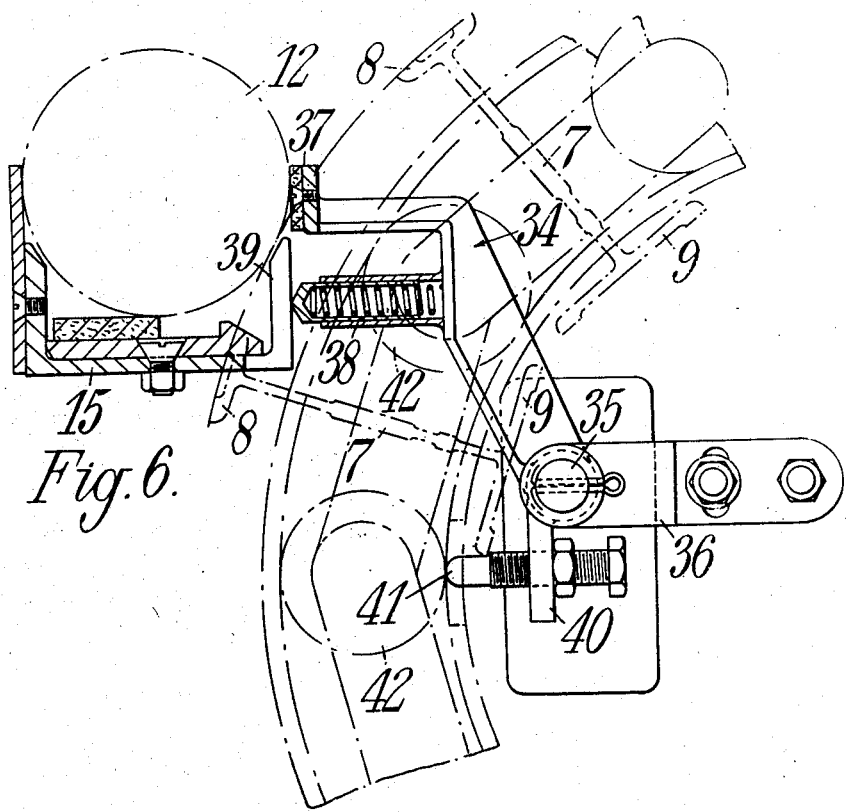
Figures 6 and 7 are side and front views of an automatic stop mechanism for controlling the delivery of the articles into a conveyor.
Figure 7:
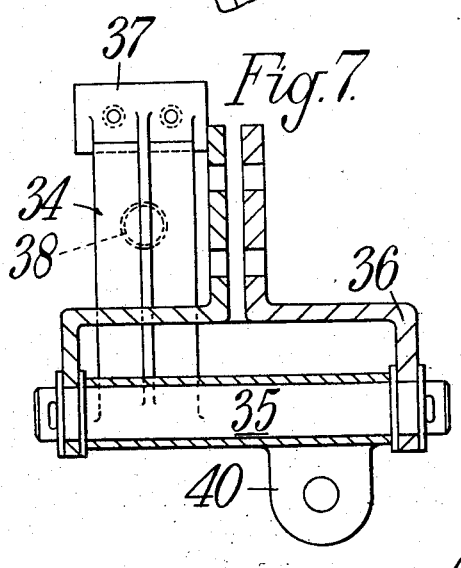

These housings are partially enclosed by the outer flanges 8 of the bars 7, which serve to hold the containers in place during the time that they are in the conveyor, but the flanges of adjacent bars are spaced apart from one another so as to form a gap or opening through which the containers may be fed into or discharged from the conveyor. If the containers are smaller in diameter than the normal width of this gap or opening, they may be fed into the conveyor housings at any point where the conveyor is moving vertically, successive rows of cans being simply rolled into the successive housings from a suitably arranged loading mechanism as the housings move past the loading position. If the containers are of such a diameter that they substantially fill the housings as shown in Figure 4 however, steps must be taken to open each housing as it passes the loading position in order to permit the containers to enter the conveyor. Thus in the arrangement shown, the chains 10, 11, are arranged within a guideway 13 which is so shaped as to cause the conveyor to follow a curved or arcuate path 14 opposite a feeding device 15, so as to cause the adjacent bars 7 to swing apart from one another after the manner of a pair of jaws, thereby causing the outer narrow flanges 8 of each succeeding pair of bars to open sufficiently to permit a row of containers 12 to fall into the accommodating space between the bars which automatically swing together again as the conveyor moves out of the curved path, thus causing the containers to be securely housed in position in the conveyor, which is driven by an electric motor or other suitable means so as to travel slowly through the sterilising or preserving apparatus at a predetermined speed, the conveyor reaching the aforesaid curved or arcuate path again on emerging from the apparatus so as to swing the bars open again and allow the containers to be discharged on to a collecting device 16.

For the purpose of feeding the containers on to the conveyor and for removing them after processing, additional conveyors 15 and 16 are provided which are conveniently of shallow trough-like form so as to be capable of locating the containers on their sides in a single continuous row. Conveniently a single endless belt 26 is arranged to serve as the moving belt for both the feeding and the collecting conveyors, this belt 26 passing round a pair of pulleys 27, 28 at opposite ends of the conveyor troughs 15 and 16 and being driven by an electric motor 29. The feeding conveyor 15 is arranged immediately in front of the curved path 14 of the main conveyor which is in turn arranged just before such conveyor moves into the upright chambers of the sterilising or preserving apparatus, and the framework of the apparatus is provided with a stop or stops 34 which is suitably geared to the main conveyor 6 as to arrest the movement of the containers when a complete row is immediately opposite its respective section of the conveyor with the containers disposed immediately in front of and slightly above the open jaws of the conveyor. In the arrangement shown, this can stop 34 is constructed in the form of a bell-crank lever, which is pivoted at 35 to the framework 36 of the apparatus and is provided with a head 37 and a spring loaded telescopic arm 38 which rests against the side 39 of the conveyor trough 15 so as to hold the stop in its normal position. The other arm 40 of the bell-crank lever carries an adjustable stop 41 which projects through a slot in the conveyor guide 13 so as to co-operate with the chain rollers 42 of the conveyor, the adjustable stop 41 being so set as to be moved back by the passage of each chain roller, so as to swing the bell-crank lever about its pivot, and move the head 37 of the container stop forward into the path of the containers, the lever being swung back into its normal position by the spring loaded telescopic arm 38 as soon as the chain roller 42 is clear of the adjustable stop 41, and the respective speeds of the two conveyors are so adjusted and synchronised as to enable a complete row of containers to be assembled in the loading position opposite the open jaws of the main conveyor between successive movements of the container stop so that they are free to roll out of the feed conveyor into the main conveyor, while the movement of further containers into the loading position is stopped, the speeds of the conveyors being so adjusted and synchronised that as soon as a row of containers has been rolled into the conveyor and moved away a successive row is moved into place on the feed conveyor and arrives in position for transfer as the next succeeding opening in the main conveyor comes opposite the feed conveyor, so that the process of feeding the containers into the main conveyor is continuous. If desired, additional means may be provided for assisting the transfer of the containers from the feed conveyor into the main conveyor. The containers are then carried through the sterilising or preserving apparatus so that the contents are processed and when the conveyor emerges from the apparatus the transfer process is repeated in reverse, the conveyor opening its bars as it reaches the aforesaid curved path 14 so as to allow the rows of containers to drop out in succession on to the belt in the collecting conveyor 16 which removes them for packing or storage.

In order to increase the capacity of the mechanism, the main conveyor is preferably constructed in double form, as shown, each bar consisting of two oppositely disposed I-sectioned members 7, 7¹ joined together or formed in one piece mounted symmetrically on each link, so that two sets of identical spaces for accommodating the containers 12 are formed on opposite sides of the conveyor. With this arrangement, the conveyor is arranged to travel a sinuous path round a second curved or arcuate path 43 in the reverse direction immediately after travelling round the first curved path 14 so as to cause each side of the conveyor to open its bars successively and additional feed and collecting conveyors 44, 45 are provided for use with the second curved path so as to cause rows of containers to be loaded into and collected from both sides of the conveyor, these additional feed and collecting conveyors being constructed in a manner similar to those already described, and being provided with a common endless conveyor belt 46 passing round a pair of pulleys 47, 48, which may be driven either by a separate electric motor or by means of the motor employed for driving the other feed conveyor through a suitable transmission, such as a chain drive 52 or from the main sterilizer conveyor by means of suitable gearing. Any suitable means may be provided for loading the containers into the feed conveyors 44, but conveniently such means takes the form of an elevator 49 which is driven by a pair of chains 50, 51, and is so arranged as to collect the containers from the runway 33 and deliver them to the feed conveyors.

On emerging from the sterilising or preserving apparatus, the conveyor automatically discharges its containers on reaching the curved paths 14 and 43, where the opposite sides of the conveyor will open successively so as to allow the containers to drop out on to the collecting conveyors 16 and 45.

The sterilising or preserving apparatus may be of any suitable form for heating and subsequently cooling the containers; thus, it may be so arranged that the aforesaid conveyor after receiving the containers passes through a water seal, then through a chamber containing steam under pressure, then through a second water seal, then through a cooling chamber and lastly through a bath 58 of cooling water. If desired, the steam chamber may be arranged in sections maintained at successively decreasing temperatures, so that the containers are cooled slightly before passing into the cooling chamber, where they may be partly cooled with spray water before passing into the final cooling bath.

I claim:

1. In an apparatus for processing containers of material, an endless conveyor for carrying containers comprising a pair of spaced apart flexible support elements made up of bar-links pivoted to each other, and a plurality of container carrier elements rigidly connected to the mid point of a bar-link of each said flexible support element, each said carrier element comprising a web portion normal to the length of said flexible elements, a central flange lying in the plane of the bar-link on which it is mounted, and terminal flanges spaced equally to each side of said flexible support elements to form a container receiving chamber between adjacent container carrier elements on each side of said support elements, said terminal flanges of adjacent carrier elements defining container loading and discharge openings on each side of said support elements and having relative movement in response to flexing of said support elements whereby the openings on the convex side open sufficiently to permit passage of a container therethrough, means to guide said flexible support elements and the carrier elements supported thereby in vertical zigzag paths through a processing plant, guiding means at least at the lower turns of said paths to retain the containers in said container receiving chambers, one upward sinuous path constituting discharge and loading positions, said path including a lower portion at a considerable angle to the vertical, a first arcuate portion flexing said support elements to the vertical whereby the containers on the lower convex side of said conveyor may be discharged outwardly through the openings enlarged by said flexure, a second arcuate portion continuing said first arcuate portion in which said openings may receive containers in loading, and similar third and fourth arcuate portions curved in the reverse direction corresponding to said first and second arcuate portions for discharge and loading of containers on said conveyor.

2. Apparatus for processing material encased in containers, comprising an endless conveyor, a plurality of carrier bars for supporting said containers rigidly secured to said conveyor in spaced positions, each of said bars extending transversely across substantially the full width of said conveyor, and projecting substantially perpendicularly from said conveyor, each of said bars having retaining means remote from said conveyor upstanding from both sides of said bar, adapted to retain containers on said bar, the retaining means of adjacent supports having spaces between them for effecting the admission or discharge of said containers at a loading position, feed conveyor means for delivering the containers into said loading position, means for synchronising the respective speeds of the conveyors whereby a complete row of containers may be automatically loaded into each accommodating space provided by the successive pairs of bars, and a pivotally arranged stop operatively associated with said conveyor, and means for swinging said stop into the feed path of the containers between the positioning of successive pairs of bars of the conveyor in the loading position in front of the feed conveyor so as to stop the supply of containers between each successive loading movement.

References Cited in the file of this patent

UNITED STATES PATENTS

| | | |
|---|---|---|
| 807,687 | Schirmer | Dec. 19, 1905 |
| 1,708,664 | Danberg | Apr. 9, 1929 |
| 2,134,832 | Morrison | Nov. 1, 1938 |
| 2,149,561 | Thompson | Mar. 7, 1939 |
| 2,211,802 | Thompson | Aug. 20, 1940 |
| 2,664,592 | Ingraham et al. | Jan. 5, 1954 |